(12) United States Patent
Ugarte (10) Patent No.: US 12,152,211 B2
(45) Date of Patent: Nov. 26, 2024

(54) PURINE TREATMENT METHOD FOR THE PRODUCTION OF A PRODUCT WITH A HIGH CALORIFIC VALUE

(71) Applicant: Sociedad de Inversiones y Rentas Tricao S.p.A., Santiago (CL)

(72) Inventor: Jose Caraball Ugarte, Santo Domingo (CL)

(*) Notice: Subject to any disclaimer, the term of this patent is extended or adjusted under 35 U.S.C. 154(b) by 0 days.

(21) Appl. No.: 17/846,385

(22) Filed: Jun. 22, 2022

(65) Prior Publication Data

US 2022/0325196 A1 Oct. 13, 2022

Related U.S. Application Data

(63) Continuation of application No. 16/094,490, filed as application No. PCT/CL2017/000009 on Apr. 10, 2017, now abandoned.

(30) Foreign Application Priority Data

Apr. 19, 2016 (CL) ..................................... 931-2016

(51) Int. Cl.
*C10L 5/42* (2006.01)
*A01C 3/00* (2006.01)

(52) U.S. Cl.
CPC .................. *C10L 5/42* (2013.01); *A01C 3/00* (2013.01); *C10L 2200/0469* (2013.01); *C10L 2290/08* (2013.01); *C10L 2290/28* (2013.01); *C10L 2290/30* (2013.01); *C10L 2290/545* (2013.01); *Y02E 50/10* (2013.01); *Y02E 50/30* (2013.01)

(58) Field of Classification Search
CPC . C10L 5/42; C10L 2200/0469; C10L 2290/08
See application file for complete search history.

(56) References Cited

U.S. PATENT DOCUMENTS

| 4,018,899 A | 4/1977 | Seckler et al. |
| 4,076,617 A * | 2/1978 | Bybel ........................ C02F 1/36 |
| | | 261/81 |

(Continued)

FOREIGN PATENT DOCUMENTS

| CA | 2670530 C | 6/2012 |
| CA | 3033420 A1 | 3/2018 |

(Continued)

OTHER PUBLICATIONS

"Straw-Pooh Briquettes Final Report Developing a Bioenergy Fuel from Manure and Other Agricultural by products," [online]. Colorado Department of Agriculture, Apr. 1, 2011 [Retrieved on May 6, 2017] Retrieved from Internet URL: <https://www.colorado.gov/pacific/sites/default/files/iCast%20-%20 Briquette_2009%20 Final %20Report. pdf>.

(Continued)

*Primary Examiner* — Ellen M McAvoy
*Assistant Examiner* — Ming Cheung Po
(74) *Attorney, Agent, or Firm* — Dennemeyer & Associates LLC; Victoria Friedman (57) ABSTRACT

The invention relates to a method for the purification of lignin, cellulose and hemicellulose obtained from purines, which can be burned in compliance with environmental standards as a substitute for wood. The method of the invention produces a novel bio-fuel.

14 Claims, 1 Drawing Sheet

(56) References Cited

U.S. PATENT DOCUMENTS

| | | | |
|---|---|---|---|
| 6,083,386 A * | 7/2000 | Lloyd | C02F 9/00 |
| | | | 119/527 |
| 6,149,694 A | 11/2000 | Redden, Jr. et al. | |
| 2002/0056690 A1* | 5/2002 | Wegner | B01D 21/0012 |
| | | | 210/512.1 |
| 2004/0154988 A1* | 8/2004 | Sheets, Sr. | B03C 3/41 |
| | | | 210/721 |
| 2004/0192980 A1 | 9/2004 | Appel et al. | |
| 2006/0243677 A1 | 11/2006 | Sheahan | |
| 2008/0171297 A1 | 7/2008 | Reynolds et al. | |
| 2009/0062581 A1* | 3/2009 | Appel | B09B 3/40 |
| | | | 422/184.1 |
| 2009/0286295 A1* | 11/2009 | Medoff | C12P 7/56 |
| | | | 435/243 |
| 2010/0162619 A1* | 7/2010 | Peus | C10L 9/083 |
| | | | 44/605 |
| 2011/0089271 A1 | 4/2011 | Werner | |
| 2013/0026760 A1 | 1/2013 | Lee et al. | |
| 2014/0250776 A1* | 9/2014 | Kennedy | C10L 5/42 |
| | | | 44/589 |
| 2015/0004654 A1 | 1/2015 | Retsina et al. | |
| 2016/0108328 A1 | 4/2016 | Bohlig et al. | |

FOREIGN PATENT DOCUMENTS

| | | | | |
|---|---|---|---|---|
| EP | 0963969 | A1 | 12/1999 | |
| ES | 2171111 | A1 | 8/2002 | |
| KR | 101098785 | B1 | 12/2011 | |
| RO | 117458 | B1 | 3/2002 | |
| UA | 82604 | U | 8/2013 | |
| WO | 2009108761 | A1 | 9/2009 | |
| WO | 2013007847 | A1 | 1/2013 | |
| WO | WO-2015086869 | A1 * | 6/2015 | ............... A01C 3/00 |

OTHER PUBLICATIONS

U.S. Patent and Trademark Office, Non-final Office Action issued in U.S. Appl. No. 16/094,490 dated Jan. 24, 2020.

U.S. Patent and Trademark Office, Final Office Action issued in U.S. Appl. No. 16/094,490 dated Dec. 17, 2020.

U.S. Patent and Trademark Office, Non-final Office Action issued in U.S. Appl. No. 16/094,490 dated Dec. 16, 2021.

Kim, Daegi & Park, Ki Young & Yoshikawa, Kunio. (2017). Conversion of Municipal Solid Wastes into Biochar through Hydrothermal Carbonization. pp. 32-487 (Year: 2017).

U.S. Patent and Trademark Office, Final Office Action issued in U.S. Appl. No. 16/094,490 dated Jun. 14. 2022.

J. L. Rico et al, Characterisation of solid and liquid fractions of dairy manure with regard to their component distribution and methane production, Bioresource Technology, vol. 98, pp. 971-979, 2007.

Karin Jorgensen et al, Chemical and biochemical variation in animal manure solids separated using different commericial separation technologies, Bioresource Technology, vol. 100, pp. 3088-3096, 2009.

H. B. Moller et al, Methane productivity of manure, straw and solid fractions of manure, Biomass and Bioenergy, vol. 26, pp. 485-495, 2004.

Christine Rossberg et al, Separation and characterisation of sulphur-free lignin from different agricultural residues, Industrial Crops and Products, vol. 73, pp. 81-89, 2015.

S. Chen et al, Value-Added Chemicals from Animal Manure, Pacific Northwest National Laboratory Final Technical Report PNNL-14495, Department of Energy United States of America, Dec. 2003.

\* cited by examiner

PURINE TREATMENT METHOD FOR THE PRODUCTION OF A PRODUCT WITH A HIGH CALORIFIC VALUE

SUMMARY

The objective is to obtain a solid biofuel comprising lignin from the manure of cattle, goats and pigs that complies with the ISO 17225-6 standard in both energy and environmental matters and a method for obtaining them.

The method is mainly based on the separation of lignin contaminants. This is achieved by the following steps: treatment of the manure in the washing pond by means of feeding the system to a washing tank; washing the manure in the wash tank by means of rotary movements and ultrasound and water drag; addition of a continuous flow of clean water into the wash tank; separation of liquids and solids; pressed for the removal of excess water from the solid biofuel without drying and finally drying it.

Although there are similar processes with the aim of obtaining a biofuel from manure, the novelty is that it is not combined with other products such as sawdust or straw; nor is there a need to incorporate chemical processes, nor is it subjected to thermal processes or carbonization. This biofuel mayor may not be compacted or pelletized for commercialization.

Cattle manure has been used as a fuel source since ancient times by mankind. The accumulation of manure as well as its burning, however, presents a series of drawbacks and dangers for human health, among them, bad odor derived from its decomposition, bad smell, generation of corrosive substances and toxic gases when burned, together with the generation of substances that stain and dirty facades and interiors of homes and buildings.

DESCRIPTIVE MEMORY

Description of the Invention

The present invention describes a method for treatment of animal slurries, particularly livestock manure, to obtain a product with high calorific value that when burned releases noxious gases in a low concentration.

Particularly, the present invention describes a method for the treatment of livestock manure, particularly cow manure, without limiting this invention use for treatment of another mammals' manure.

This method allows to obtain a product with high calorific value and low release of noxious gases and ash when burned, particularly corresponding to lignin.

In cattle industry, manure production is a problem that is often hard to address, because it is a waste product that can pollute plots, groundwater and the environment in general if it is not properly managed. Likewise, there is a concern in the health management of manure in the milk and cattle industries.

According to the FAO, the livestock sector is one of the major contributors for the greenhouse effect in the world, being highly noxious, according to a report emitted by the Food and Agriculture Organization of the United Nations (FAO, FA Livestock's long shadow environmental issues and options 2006). That report indicates that the livestock sector produces greenhouse gases levels that when measured in carbon dioxide ($CO_2$) equivalent are higher than the produced by the transportation industry.

Moreover, the same 2006 FAO report, indicates that livestock farming does not only threaten the environment, but it is also one of the main causes for degradation of soil and hydric resources.

Regarding the environmental cost in the 2006 FAO study, it is indicated that "each livestock production unit has to be reduced at least by a half to prevent the situation from worsening".

Particularly, the manure produced by the livestock systems can elicit a negative environmental impact if there is not control of storage, transport or application of it, because of the release of polluting gases into the atmosphere, and the accumulation of micro and macronutrients in the soil and surface water bodies. In the USA, there are specific laws for animal excrement management and deposit that impact water bodies, soil and atmosphere, which are supervised and certified by the Environmental Protection Agency (EPA). In Canada, animal excrement management and deposit regulations are not less rigorous.

In Latin-American countries like Argentina, Chile, Colombia and Mexico, regulation and surveillance of use and management of excrement are more limited, because only rules for pollutant discharges into the water are specified, reducing the importance to emissions into the atmosphere and soil, and without clear specifications about livestock manure. (Agroscience vol. 46 no. 4 México May/June 2012).

Mindful about the fact that Climate Change represents a pressing threat with potentially irreversible effects for human societies and the planet, in Dec. 11, 2015 the Paris Agreement was approved with views to speed up the reduction of greenhouse effect gases global emissions (Project of Agreement—$21^{st}$ Conference de las Parties on Climate Change—Paris, from November 30 to Nov. 11, 2015)

This Agreement presents the dire need to solve the major gap existing between the aggregate effect of the promises of mitigation from the Parties or Countries, expressed in terms of annual global greenhouse effect gases emissions in year 2020, and the trajectories that the aggregated emissions should follow to keep the global mean temperature raise well below 2 degrees Celsius respect to preindustrial levels, and keep on continuing the efforts in limiting the temperature raise to 1.5 degrees Celsius.

In this agreement, each one of the signatory countries, committed to work in the reduction of greenhouse gases emissions, by for example, the promotion of renewable and non-conventional energy use, and in the substitution of fossil resources.

This invention presents a biomass product with a high calorific value that is highly efficient in the contribution to the reduction in greenhouse gases emissions. In practice it allows the substitution of fossil resources with biomass.

Greenhouse Effect Gases Emissions by the Livestock Industry

The livestock industry is responsible for the 18 percent of greenhouse gases emissions when measured in $CO_2$ equivalent. Its involvement is higher than the transport industry.

The livestock sector is responsible for the 9% of anthropogenic $CO_2$ emissions. For the most part, these emissions are derived from changes in soil use, specially from the deforestation caused by expansion of grasslands for fodder production. Likewise, livestock is responsible of gases emissions with higher atmosphere heating potential. This sector delivers the 37% of anthropogenic methane (with 23 times the global warming potential (GWP) of $CO_2$) mainly produced by ruminants' enteric fermentation. It emits 65% of the anthropogenic nitrous oxide (with 296 times the GWP of $CO_2$), mostly through manure. Livestock is also responsible for two thirds (64%) of the anthropogenic ammonia emissions that contribute significantly to acid rain and ecosystem acidification.

These high levels of emissions leave open big opportunities for climate change mitigation by taking action within the livestock industry (FAO Livestock's long shadow environmental issues and options 2006)

It should be noted that livestock industry is responsible for 20% of the terrestrial animal biomass.

Such as it is described in this invention, it is necessary to provide methods for excrement and manure treatment for obtaining products with high calorific value that when burnt release low concentration of noxious gases.

Water Contamination

Livestock industry is a key factor in the increase of water usage because it is responsible for 8% of global water consumption, mostly for watering of fodder crops (FAO Livestock's Longshadow environmental issues and options 2009). Likewise, livestock industry is probably the most important source for water contamination and is a big contributor to eutrophication, to "dead" zones in coastal areas, to the degradation of coral reefs, to the increase in health problems for humans, to antibiotics resistance and to many other problems. The main contamination sources come from animal waste, antibiotics and hormones, chemical products used in tanneries, fertilizers and pesticides for fodder crops and sediments from eroded pastures.

This invention partly alleviates the effect that livestock has on water contamination. (FAO Livestock's Longshadow environmental issues and options 2009)

STATE TO OF THE ART

According to the FAO (http://www.fao.org/ag/againfo/programmes/es/lead/toolbox/Tecl21Mansto.htm), Netherlands standards for annual manure mixture (including stool and urine but excluding waste water) produced by livestock are:

Adult dairy cows: 23,000 L
Fattening cattle (1-2 years) 10,000 L
Sows with piglets: 4,700 L
Fattening pigs: 1,100 L
Broilers: 11 L
Laying hens: 87 L Particularly, in the livestock industry, manure and slurry, usually correspond to a mixture of animal stool with urine and eventually bedding, understanding the last one as a place for animal rest and feeding.

In addition to containing stool and urine, excrement might be composed by other elements such as the ones in bedding, usually straw, and sawdust, wood shavings, chemicals, sand, leftovers from livestock food and water.

Normally, excrement is applied on fields, providing soil with organic matter. Organic matter contribution entails an improvement on the structure of soil, as well as an increase in water holding capacity.

On the other hand, excrement is a source of nutritional components for plants (N, P, K).

Nutrient and mineral amount contained in excrement, depends on various factors, being prominent among them: type of livestock, livestock feeding (directly linked with animal destination) and environmental conditions.

Among the components that constitute excrement there are various plant residues where lignocellulose and its derivatives stand out.

Lignocellulose is a complex material that constitutes the main structure for plant cell walls and is mostly constituted by cellulose (40-50%), hemicellulose (25-30%) and lignin (15-20%). Cellulose is a homogeneous linear polymer constituted by 7.000 to 15.000 glucose units linked with glycosidic bonds stabilized by hydrogen bonds. Hemicellulose is a ramified or lineal heteropolymer constituted by 200-400 units of various pentoses, hexoses and uronic acids with an amorphous structure.

Lignin is an amorphous reticulated polymer with three units of p-coumaroyl phenylpropane, coniferyl and alcohol. In order to decrease global dependency on fossil fuels, there is a sustainable alternative for energy sources and chemical products to be exploited. One of these possible sources is lignocellulose biomass like timber or agricultural waste (Brethauer, S., & Studer, M. H. (2015). Biochemical Conversion Processes of Lignocellulosic Biomass to Fuels and Chemicals-A Review. CHIMIA International Journal for Chemistry, 69(10), 572-581)

Cow manure is commonly found in agricultural waste, available at very low cost. It has been studied that the product obtained from this manure treatment can be used without previous treatment as fuel or raw material for fuel.

So far techniques have been described for detection and quantification of the contents of the main components of excrement (cellulosic and protein components), where a solid/liquid physical separation method, excrement hydrolysis and fungi culture are used in order to recover carbohydrates and proteins from raw material to produce cellulase (Value-Added Chemicals from Animal Manure S. Chen, et al. Pacific Northwest National Laboratory, 2003) In the case of collection of lignin from agricultural waste and quality assessment by different analytical methods, is basically done by subjecting agricultural residues to a reduction to an alkaline paste, treating it with formic acid and hydrogen peroxide to characterize lignin through the Klason method, FT-IR spectroscopy, elemental analysis, thioacidolysis, SEC and several wet chemical methods (Separation and characterisation of sulphur-free lignin from different agricultural residues Christine Rossberga, Martina Bremer, Susanne Machill, Swetlana Koenigc, Gerhard Kerns, Carmen Boeriud, Elisabeth Windeisene, Steffen Fischer, Industrial Crops and Products, VOL 73, pages 81-89, 30 Oct. 2015).

Among the most used general techniques for mechanic separation of liquid/solid fractions in excrement at commercial scale plants are the decantation by centrifugation, chemical treatment and filter belt press, rotary drum filter and screw press, screw press and vibration filter, and screw press alone. It is considered that they only include mechanic separation methods using filters in movement and presses (Chemical and biochemical variation in animal manure solids separated using different commercial separation technologies Karin JOrgensen, Lars Stoumann Jensen Bioresource Technology 100 (2009) 3088-153096)

Besides mechanical separation techniques of the liquid/solid fraction of excrement, a method for separation has been described by means of a coagulation-flocculation process, whose separation protocol consists in taking raw excrement stored at 4° C. and sift it through a 1 mm mesh, then subject it to a coagulation-flocculation process according the following conditions and stages: (1) for the coagulation process, a coagulation solution is added and mixed for 2 minutes at 175 rpm; (2) for flocculation, a polyacrylamide solution is added and mixed for 13 minutes at 50 rpm; (3) for solids formation, a waiting time is needed: 2 hours when supernatant was removed, or 5 minutes when a press filter is used to separate the solid fraction (Characterization of solid and liquid fractions of dairy manure with regard to their component distribution and methane production J. L. Rico, H. Garcia, C. Rico, I. Tejero Bioresource Technology 98(2007) 971-979).

Another component that can be found on slurry is methane, a gas used as fuel. This component's yield and quality has been studied when obtained from excrement, showing its results according to the volatile solids (VS) parameter (Methane productivity of manure, straw and solid fractions of manure H. B. Moller, S. G. Sommer, B. K. Ahring, Biomass and Bioenergy 26 (2004) 485-495)

Moreover, there are extraction processes of excrement products for other purposes. For example, the U.S. Pat. No. 4,018,899 A document discloses a process for food products extraction out of animal excrement which involves: forming an excrement water in a pit and letting said suspension to ferment; then separating said suspension in solid and liquid fractions, where the solid fraction comprises a silage component such as undigested fibers and grain; where the liquid fraction comprises protein-rich nutrients and dense relatively non digestible mineral materials and fiber particles, and finally separating said components and then processing the liquid fraction for its use as a dietary supplement that contains relatively low quantities of non-digestible minerals such as lignin, hemicellulose and fiber particles.

In the WO 2015086869 A1 y ES 2171111 A1 documents, different procedures for manure treatment are presented. The WO 2015086869 A1 document discloses a procedure that comprises: (a) solid/liquid physical separation in a manure-containing liquid effluent (b) physicochemical separation of the liquid fraction obtained on (a) stage to obtain a solid and a liquid fraction (e) electrocoagulation of the liquid fraction obtained on the (b) stage to obtain a solid and a liquid fraction; and (d) pelleting of the solid fractions obtained on the (a), (b) and (c) stages in presence of chemical materials or lignocelluloses. Besides, this document indicates that the solid agglomerate obtained on the pelleting process, offering high calorific value in combustion, and the resulting liquid has a very low nitrogenated compounds content.

On its side the ES 2171111 A1 document presents a procedure and a treatment plant for slurry that comprises: (i) performing a physicochemical treatment on the liquid phase of slurries to reduce ammonia emission from said slurries during the evaporation stage, through stripping or fixation by acidification; (ii) subjecting the liquid stream obtained in the (i) stage to vacuum evaporation until collection of a solid concentrate that contains 20 to 30% solid weight; and (iii) drying the solid concentrate from the (ii) stage until a product with 12% maximum moisture is obtained, useful as organic compost, or when enriched with a fertilizer ammonia salt.

It was also found that in the WO 2013007847 A1 document a system for treatment of slurry through electrocoagulation and electrooxidation is presented, that consists on slurry inclusion to a slurry raft through a bombing system, where it is exposed to a solid liquid press separator. This process consists on sending solids to a storage container to dry them through exposure to fresh air or drying them artificially to obtain fertilizing compost for soil, whereas liquids are sent to a flotation-flocculation tank. In this flotation-flocculation tank the produced sludge is sent to the press-filter, from which then they are mixed with the solids obtained on the storage container, meanwhile the liquid matter is sent to an electrocoagulation unit for separation of floating sludges from the precipitated sludges and clarified water is sent to a deposit. Floating sludges are transferred by decantation to the press filter, whilst precipitated sludges are purged and the treated water is sent to a process where caustic soda is added to it to raise its pH and send it to an electrooxidation stage.

In the WO 2009108761 A1 and U.S. Pat. No. 6,149,694 A documents procedures to produce fuel from organic waste are disclosed. The WO2009108761 A1 document discloses a procedure to produce fuel from liquid hydrocarbons from organic waste materials. The procedure consists in preparing a suspension from waste materials to make a stream, the stream volume is accumulated in a container with agitation. Subsequently, the stream is heated to approximately 60-700° C. and is subjected to a 20-600 psi pressure to decompose solid organic materials and inorganic materials separately.

Furthermore, the U.S. Pat. No. 6,149,694 A document introduces a procedure to make fuel from livestock residues that comprises: (i) make a mixture that has a number of solid components derived from livestock residues and a second waste product different from livestock residues, where solid components have a moisture content before said formation stage, and where the formed mix has a lower moisture content that the solid content, and (b) forming the resulting mixture from stage (a) into a self-sustaining body that has a density near 20-40 pounds/feet3 approximately.

The CA 2670530 C, DE 102010019321 A1 and US 20150004654 documents present procedures for mechanic separation of liquid and solid components from excrement used as raw material to produce combustible pellet. Of those, the CA 2670530 C document discloses that said pellet has approximately 25-75% of cellulosic materials (cellulose, lignin and hemi-cellulose); and approximately between 14-75% in waxed cellulosic material, that corresponds to lignocellulose to which a coat of wax was added.

In the case of the DE 102010019321 A1 document, it presents a process to produce combustible pellets from a starting mixture composed by liquid and solid components, where said method consists on the following steps: separate solid and liquid components, extract the energy from liquid components and dry the solid constituents.

At last, the US 20150004654 document discloses a procedure to produce a biomass pellet and sugar from cellulosic material.

Humanity, from the beginning of time up to date has used the burning of manure as fuel. However, it is known that this causes several health issues. WHO estimations suggest that up to 6.5% of the annual burden of disease in developing nations is due to solid fuel combustion on the interior environment (Combustion of dried animal dung as biofuel results in the generation of highly redox active fine particulates, Particle and Fiber Toxicology 2005, 2:6, 4 Oct. 2005).

It is relevant to indicate that the odor produced by the direct burn of manure is an important is a very important factor because it impregnates clothing, housing and complete environments, besides the obvious environmental problems that it causes.

Besides the previously described health issues, there are technical problems when using this type of fuels without previous treatment. In boilers, corrosion of steel is observed whatever its origin might be (normal steel, chromium steel, stainless steel). Is possible to observe a corrosion of 8 mm per year. (http://www.um.edu.uy/docs/6 comportamiento de cenizas_y_suim pacto en sistemas de %20combustion de_biomasa.pdf Biomass Ash Behaviour and its Impact on Combustion Systems, Memoria de Trabajos de Difusión Científica y Técnica, núm. 10 (2012) 69, ISSN 1510-7450, ISSN (en linea) 1688-9584)

This problem also happens when biomass from animal fodder, leaves and tree branches because chlorine fixes to leaves, bark and every fast-growing culture.

The present invention corresponds to a calorific energy product free from contaminants and odor. This being a combustible product with high calorific value, but deriving from the animal waste known as slurry.

Due to the ruminant animal's diet, that feed mainly on grass, their digestive process uses cellulose and hemicellulose as sugar sources, leaving lignin as waste which is indigestible, but with a calorific value of approximately of 5500-6500 Kcal/Kg. (Estudios de Valoración Energética de Combustibles Forestales para la prevención de incendios Forestales en Sierra de la Primavera (Jalisco México) mediante calorimetría de Combustión y ensayos de Inflamabilidad, Tesis Antonio Rodríguez Rivas, Universidad de Compostela, España, 2009)

DETAILED DESCRIPTION OF THE INVENTION

The present invention corresponds to a method and, in turn, the obtained product from this method, for the treatment of manure that allows collection of the largest quantity of lignin as raw material and/or fuel. The procedure uses organic waste from livestock, which consists on stool and urine and/or slurry.

This invention corresponds to a method for treatment of excrement that leads to obtaining a high quality combustible product that can efficiently substitute firewood and coal, in boilers be they from housing or industrial use.

By quality is meant a high efficiency standard, by means of higher quantity of kilocalories, a lesser emission of toxic gases, a lesser production of ash as combustion waste, like having an ammonia production process in harmony with current environmental standards, such as environmental care, helping to decrease environmental contamination, decrease gases emissions, improving the sanitary status of livestock enterprises, and recycling the liquids and solids involved in the process, reusing them efficiently.

Said combustible product of the present invention, is obtained through treatment of slurry or excrement for the collection of lignin as raw material and/or fuel.

Detailed Description of the Process:

Basin is defined as the pool where stool and urine from livestock arrive. Likewise, it can be composed by other elements, such as those present in livestock bedding (straw and sawdust), wood shavings, chemicals, sand, cattle food leftovers, and water, among many others.

Figure 1:
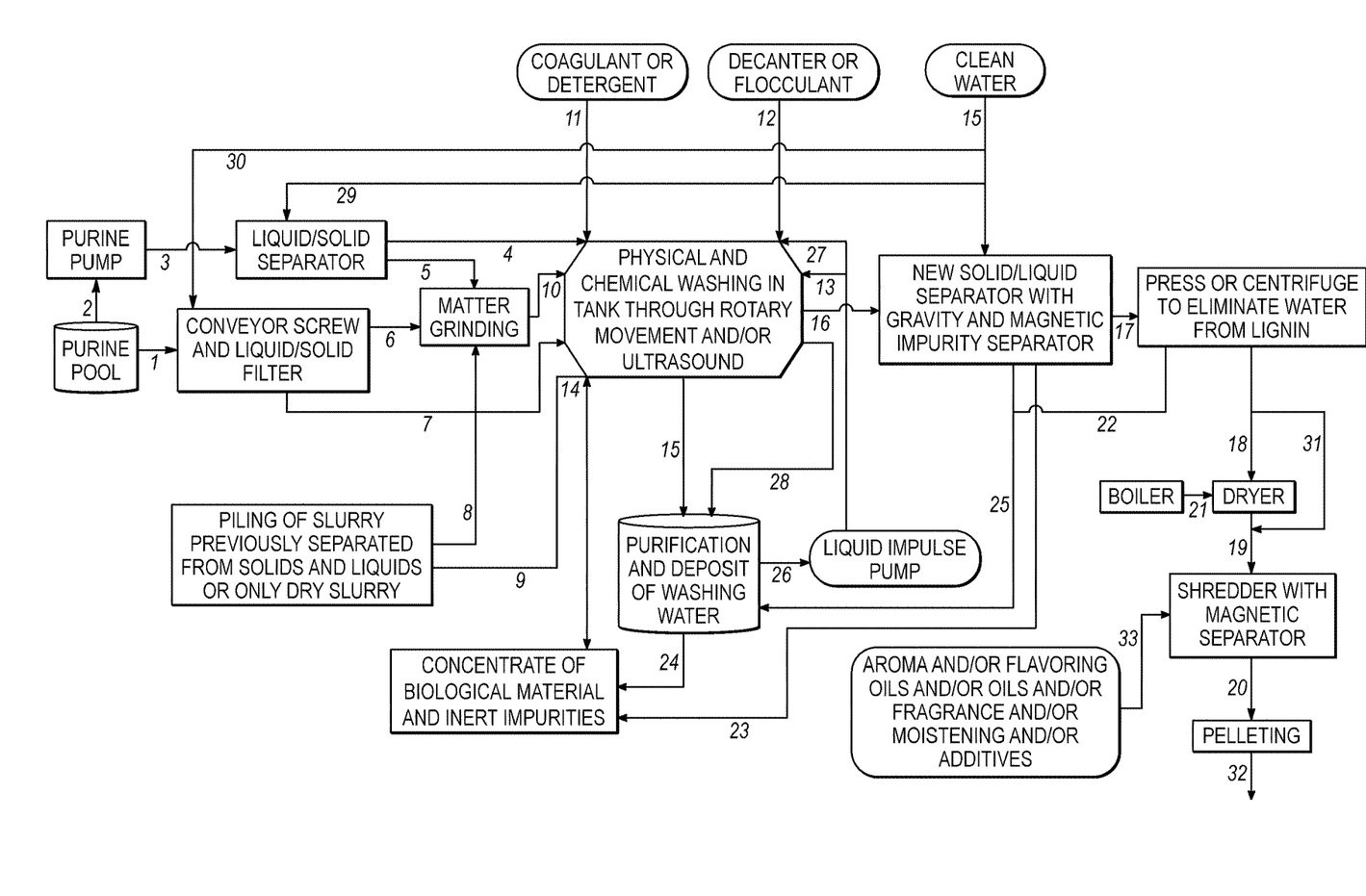
FIG. 1. Block diagram of slurry treatment for lignin collection as raw material and/or fuel and other chemicals. Operations are shown in blocks, flow lines or currents are presented with arrows that indica to flow direction, besides they are represented with numbers.

The process can be done through three alternative pathways of the system supply.

In the first alternative for system supply of the step 1(A). Material emerging from the basin arrives to a conveyor screw that, with a liquid filtering, that optionally can be prewashed through water from step 30, is inserted through the upper part of the screw. Optionally it can, through step 6, entera mill and then go directly to step 10 where it enters the Physical and/or Chemical Washing Tank. For its part, if step 7 is chosen the material arrives directly to said tank.

The second system supply alternative step 2 (B). The Basing Pump takes slurry and drives it through a hose taking them to step 3, that is a traditional separator of liquids and solids, is supplied by water through step 29. Separated material by the Liquids and Solids Separator can be directed through two independent flows, these are step 4 and step 5. Step 4 consists on taking the treated material in the separator and deposit it directly to the Physical and/or Chemical Washing Tank. Optionally, step 5 can be used, taking it to the Mincer Mill that, in turn, through step 10, gets to the Physical and/or Chemical Washing Tank.

The third alternative of system supply (C) uses the Stack of Slurries, that corresponds to the one formed by the waste from the liquid and solid separators from basins and/or biogas plants or duff accumulation optionally going through step 8 to milling to step 10 to the Physical and/or Chemical Washing Tank, or through step 9 directly to the Physical and/or Chemical Washing Tank.

Any of the used alternatives (a, b or c), allows to take the material to a washing tank. The Physical and/or Chemical Washing Tank works through rotatory movements and/or ultrasound and carry by water where all interior and exterior contaminants that come with contaminated fiber are detached. For this coagulating agents or detergents can be added through step 11 and/or add a decanter and/or flocculants through step 12.

Inside de Physical and/or Chemical Washing Tank there's a continuous clean water flow that enters through the steps 13 upper entry, and step 27 lower entry, that come from the liquid driving pump that is supplied with step 26, coming in turn from the Purifier and Accumulator Tank, that is supplied through step 28, and through step 15. On its part, the Washing Water Purifying and Accumulation Tank generates a flow that is represented by step 24 and that supplies the Biological Materials and Inert Impurities Concentration Tank, that are treated to make them into compost. Likewise, said Biological Materials and Inert Impurities Concentration Tank is supplied directly by the Physical and/or Chemical Washing Tank through step 14.

Once finished the washing steps made in the Physical and/or Chemical Washing Tank, clean material is expelled from the washing tank through step 16 where it arrives to a New Liquid and Solid Separator Tank that has a magnetic plate, that retains ferrous elements and these are eliminated through step 23 where organic and inorganic materials go, and these are placed in the Biological Materials and Inert Impurities Concentration Tank. On its part, water coming from the New Liquid and Solid Separator Tank enters the Washing Water Purifying and Accumulation Tank through step 25, at the same time fresh water enters by spraying the system doing the work of final rising of material, that enters through step 15.

Finished material is transported through step 17 to the pressing or centrifugation section, which removes excess water from the material, that, subsequently, is carried through step 18 that consists on a dryer, that is supplied by hot air through step 21 that in turn is supplied by the Boiler, where why the material above, via step 19, to the Mincer with Magnetic Separator. Residual water from the Press process for water removal from lignin is sent to the Washing Water Purifying and Accumulation Tank through step 22.

Alternative to step 18, this stage of the process can be done directly via step 31, which also feeds the Mincer with Magnetic Separator.

Material that is being worked on inside the Mincer with Magnetic Separator, can be enriched through step 33, that adds scents or sorne chemical that provides extra properties not belonging to the material.

Material that has been processed is incorporated to the Pelleting process through step 20.

Finally, through step 32, lignin pellets or briquettes are obtained.

This invention, in addition to cleaning fiber from all kinds of impurities on the outside, is also capable of cleaning fiber from the inside which is full of bacteria, enzymes, gastric juices that are the responsible from dissolving cellulose and hemicellulose to transform them into sugars, but when exiting the animal these stay inside fiber as contaminant materials and when burned these release odor and noxious gases to health.

Example 1. Quantitative Determination of the Components in LIW Originating from Los Tilos and Los Robles Estates, Bio-Bio Region, Chile Quantitative determination of the components from samples in LIW of treatment of slurry for lignin collection as raw material and/or fuel and other chemical compounds was done with the objective of characterizing the sample before the process, with the objective of knowing the original compounds of the sample before the process and final compounds after the process, Nitrate and nitrite determination was done through the SM-4110B methodology "Standard Methods for the examination of Water and Wastewater, 22 th Edition 2012."

The 4110B standard method corresponds to an ion chromatography with chemical suspension of eluent conductivity. This technique consists in taking a water sample that is injected into an eluent current that goes through a series of ionic exchangers. Relevant anions are separated according their relative affinities to a low capacity, the anion exchanger is strongly alkaline. Separated anions are directed through a suppressor device that provides the continuous suppression to the eluent conductivity and improves its response. The anion separator suppressor changes into its highly conductive acid form, while eluent conductivity is largely reduced. Separated anions on their acid form are measured by conductivity, which are identified on the basis of retention time in comparison with standards.

To determine Kjeldahl nitrogen, the 2313-28 of 98 methodology was used according the Formalized Chilean Standards, NCh 2313 series—Liquid Industrial Waste.

For total Nitrogen quantification the SM-4500NA methodology was used that corresponds to the total amount of Nitrate, Nitrile and Kjeldahl nitrogen expressed in mg/L N.

For quantitative determination of dissolved phosphorous, total phosphorous and COD the 2313-15 of 97 methodology was used according to the Formalized Chilean Standards, NCh 2313 series-Liquid Industrial Waste.

For pH measurement the 2313-1 of 95 methodology was used according to the Formalized Chilean Standards, NCh 2313 series-Liquid Industrial Waste.

For calcium, phosphorous and magnesium ions the SM-3120B was used "Standard Methods for the examination of Water and Wastewater, 22 th Edition 2012."

The 5310C standard methodology corresponds to determination of metals in water by plasma emission spectroscopy, starting with a sample preparation, to each analytical line a detection limit, precision, background optimal positions, lineal dynamic range and interference are established. Instrument configuration reproducibility and operation conditions are verified by using an emission-atom-ion intensity relation. The instrument is heated during 30 minutes. Optical alignment for polychromes is performed. Spectrometer entry slit and plasma torch alignment are checked. Then aspirates for less than 15 seconds after reaching plasma before starting with signal integration. To eliminate dragging of the previous standard, it is rinsed for 60 seconds with a calibration blank. The sample analysis is carried on calibrating with the calibrating blank. It is rinsed for 60 seconds with diluted acid in between samples and blank spaces. A sample is put in a nebulizer chamber, injecting plasma. The sample is subjected to temperatures between 6000 and 8000K. Resulting high atom percentage ionization produces an ionic emission spectrum, which are analyzed through a monochromator to examine emission wavelengths sequentially, or through a polychromator that simultaneously supervises all wavelengths using a reading system controlled by a computer. Sequential approach provides a greater wavelength selection, while simultaneous approach can provide a higher simple yield.

For TOC determination (total organic carbon) the SM-5310C methodology was used "Standard Methods for the examination of Water and Wastewater, 22 th Edition 2012."

The standard 5310 methodology corresponds to a persulfate-UV method or a persulfate oxidation by heat. Using a total organic carbon analyzer. Organic carbon is oxidized to $CO_2$ by persulfate in presence of heat or UV light. Produced $CO_2$ can be purged from the sample, is dried and transformed with a gas carried to a non-dispersive infrared analyzer, or be titrated by colorimetric analysis, or be separated from the liquid current through a membrane that allows specific passage of $CO_2$ to high purity water where a change in conductivity is measured and compared with $CO_2$ passing through the membrane.

Total fixed solids were analyzed under the SM-2540E methodology "Standard Methods for the examination of Water and Wastewater, 22 th Edition 2012."

Standard 2540E method can be used for fixed and volatile solids determination when ignited at 550° C. The residue that is ignited is obtained from solid matter in suspension in water, Surface water, salt water, as well as domestic waste water and international drinking water using standard methods B, C or D. The residue is ignited up until a constant weight at 550° C. Remaining solids represent the established dissolved total or solids in suspension, while lost weight represents volatile solids.

For DBO5 quantification the 2313-5 of 51 methodology was used according to the Formalized Chilean Standards, NCh 2313 series-Industrial Wastes.

TABLE 1

Analysis results of LIW samples from Los Robles and Los Tilos estates.

| Parameter | LIW Los Robles | Los Tilos |
|---|---|---|
| Nitrate (mg N—NO3/L) | <0.20 | <0.20 |
| Nitrite (mg N—NO2/L) | <0.10 | <0.10 |
| Kjeldahl Nitrogen (mg N/L) | 1545 | 768 |
| Total Nitrogen (mg N/L) | 1545 | 768 |
| Dissolved phosphorous (mg P/L) | 61.7 | 26 |
| pH | 6.92 (18.9° C.) | 4.98(19° C.) |
| Total phosphorous (mg P/L) | 264 | 148 |
| Calcium (mg Ca/L) | 853 | 146 |
| Potassium (mg K/L) | 512 | 243 |
| Magnesium (mg mg/L) | 244 | 44.2 |
| COT (mg/L) | 5725 | 3240 |
| DBO5 (mg/L) | 16400 | 9435 |
| DQO (mg/L) | 20826 | 15948 |
| Total fixed solids (mg/L) | 22710 | 5810 |

Example 2. Quantitative Determination of Sample Components in Sludges from Los Robles and Los Tilos Estates, Bio-Bio Region, Chile Quantitative determination of sludge components from slurry treatment for lignin collection as raw material and/or fuel and other chemical components was carried out with the objective of characterizing sample components with the objective of knowing the original sample compounds before the process and final compounds after the process For total nitrogen determination the CNA-ME1411 methodology was used (http:/lsnifJ.sm_.sob.cl/Sistem2Sanci0n/D0cumento1Downlo_dDoc tUtH.:-ntc)/':'l?6) "Methods based on CNA recommended analysis for soil and tissues".

For available phosphorus and total phosphorus, the RML- and RML-0000 methodologies were used, respectively according to the Rules for management of sludges originated from waste water treatment plants according to DS 4 (Supreme Decret 4, http://www.sinia.cl/1292/articles-45936 DS4 92.pdf)

For calcium, potassium and magnesium ions the EPA-6010C methodology was used "EPA, Test Methods for evaluating Solid Waste SW 846".

The EPA-6010C methodology uses the ICP-AES technique in other words inducible coupled plasma atomic emission spectroscopy. This method describes multi-elemental determinations via sequential or simultaneous optic systems and axial or radial view of plasma. The instrument measures emission spectrum characteristics through optic spectrometry. The sample is nebulized and the resulting spray is transported to the plasma torch. Emission spectra are specific elements produced by an inducible coupled plasma radiofrequency. Spectra are dispersed through a mesh spectrometer, and the emission lines intensities are controlled by photosensitive devices.

For COT determination the CNA-MET7.2 methodology was used "Métodos basados en analisis recomendados CNA para suelos y tejidos".

For pH measurement the CNS-0000 methodology was used according to the Rules for management of sludges originated from waste water treatment plants according to DS 4. (Supreme decret 4, http://www.sinia.cl/1292/articles-45936 DS4 92.pdf)

Moisture percentage, total fixed solids and total volatile solids were determined through the SM-2540B methodology according to the Rules for management of sludges originated from waste water treatment plants according to DS 4. (Supreme decret 4, http://www.sinia.cl/1292/articles-45936 DS4 92.pdf).

This 2540 B standard method is applicable in drinking, surface, sea, ground, domestic and industrial waste water, in ranges up to 20000 mg/L. The well mixed sample is evaporated in a capsule dried to a constant weight in a stove at 103-105° C.; the increase in the capsule's weight represents total solids. The temperature at which the residue is dried is important and interferes in the results, due to the weight loss caused by volatilization of organic matter, occluded mechanic water, water from crystallization and thermoinduced decomposition gases, as the weight gain due to oxidation, depends on temperature and warm-up time.

TABLE 2

Analysis results of samples from sludges from Los Robles and Los Tilos estates, Bio-Bio Region, Chile.
Sludge

| Parameter | Los Robles | Los Tilos |
|---|---|---|
| Total nitrogen (mg N/Kg) | 1775 | 1469 |
| Available phosphorous (mg P/Kg) | 676 | 462 |
| Total phosphorous (mg P/Kg) | 3272 | 2419 |
| Calcium (mg Ca/Kg) | 5640 | 2075 |
| Potassium (mg K/Kg) | 145 | 56.1 |

TABLE 2-continued

Analysis results of samples from sludges from Los Robles and Los Tilos estates, Bio-Bio Region, Chile.
Sludge

| Parameter | Los Robles | Los Tilos |
|---|---|---|
| Magnesium (mg Mg/Kg) | 407 | 193 |
| COT (mg/Kg) | 450582 | 449227 |
| Humidity (%) | 76.5 | 69.5 |
| PH | 7.41 (20° C.) | 7.24 (20.6° C.) |
| Total solid fixed (mg/Kg) | 8578 | 70115 |
| Volatile total solid (mg/Kg) | 226089 | 235073 |

Example 3. Analysis of Excrement and Intermediary and Final Products

Down below, results for the analysis of excrement, described as raw material, are presented, before entering the process described on the present invention. Analysis were made with common technique for each one of them.

TABLE 3

Results for raw material analysis.

| Parameter | NORM (3) | Sample reception (1) | Dry-basis (2) |
|---|---|---|---|
| Total humidity (%) | UNE-EN 14774-1:2010 | 8.58 | |
| Residual humidity (%) | UNE-EN 14774-1:2010 | 8.58 | |
| Ashes (%) | UNE-EN 14775:2010 | 22.06 | 24.13 |
| Volatile Material (%) | UNE-EN 15148:2010 | 55.94 | 61.19 |
| Fixed Carbon (%) | ASTM D3172 - 13 | 13.42 | 14.67 |
| Sulfur (%) | ASTM D4239 - 14e2 | 0.27 | 0.29 |
| High Calorific Value(kcal/kg) | UNE-EN 14918:2011 | 3571 | 3906 |
| Low Calorific Value(kcal/kg) | UNE-EN 14918:2011 | 3277 | 3639 |

(1) Sample reception = Condition in which the sample is delivered to the laboratory
(2) Dry basis = Material received with 0% moisture
(3) For appendix details see also the Appendix for details of the standards

TABLE 4

Results for raw material analysis.

| Parameter | NORM (3) | Sample reception (1) | Dry-basis (2) |
|---|---|---|---|
| Carbon (%) | UNE-EN 15104:2011 | 34.52 | 37.76 |
| Hydrogen (%) | UNE-EN 15104:2011 | 5.66 | 5.14 |
| Nitrogen (%) | UNE-EN 15104:2011 | 2.14 | 2.35 |
| Oxygen (%) | UNE-EN 15296:2011 | 35.03 | 29.99 |
| Mn (ppm) | UNE-EN 15297:2011 | 270 | 295 |
| As (ppm) | UNE-EN 15297:2011 | <50 | <50 |
| Pb (ppm) | UNE-EN 15297:2011 | <50 | <50 |
| Cu (ppm) | UNE-EN 15297:2011 | 100 | 109 |
| Cr (ppm) | UNE-EN 15297:2011 | <50 | <50 |
| Cd (ppm) | UNE-EN 15297:2011 | <50 | <50 |
| Mo (ppm) | UNE-EN 15297:2011 | <50 | <50 |
| Ni (ppm) | UNE-EN 15297:2011 | <50 | <50 |
| V (ppm) | UNE-EN 15297:2011 | 50 | 55 |
| Co (ppm) | UNE-EN 15297:2011 | <50 | <50 |

TABLE 4-continued

Results for raw material analysis.

| Parameter | NORM (3) | Sample reception (1) | Dry-basis (2) |
|---|---|---|---|
| Zn (ppm) | UNE-EN 15297:2011 | 120 | 131 |
| Sb (ppm) | UNE-EN 15297:2011 | <50 | <50 |
| Cl (ppm) | UNE-EN 15289:2011 | 3150.14 | 3445.88 |

(1) Sample reception = Condition in which the sample is delivered to the laboratory
(2) Dry basis = Material received with 0% moisture
(3) For appendix details see also the Appendix for details of the standards

TABLE 5

Melting point of ash from reducing atmosphere of raw material

| Parameter | Initial | final |
|---|---|---|
| Deformation temperature (° C.) | 1125 | 1148 |
| Softening Temperature (° C.) | 1143 | 1168 |
| Semi-sphere Temperature (° C.) | 1158 | 1178 |
| Fluidity Temperature (° C.) | 1225 | 1220 |

TABLE 6

Chemical analysis of ash Major, Minor and Trace 5 Elements in raw material.

| Parameter | Result |
|---|---|
| $SiO_2$ (%) | 2.93 |
| $Al_2O_3$ (%) | 12.33 |
| $Fe_2O_3$ (%) | 10.49 |
| MgO (%) | 6.23 |
| CaO (%) | 16.23 |
| $Na_2O$ (%) | 3.97 |
| $K_2O$ (%) | 3.58 |
| $TiO_2$ (%) | 0.23 |
| $P_2O_5$ (%) | 0.12 |
| $SO_3$ (%) | NS |
| $V_2O_5$ (%) | NS |
| MnO (%) | NS |

Down below, the results presented are for the intermediate product, which corresponds to the product that comes from the liquid solid separator (slurry). Analysis were made with common techniques for each one of them.

TABLE 7

Results for the analysis of the intermediate product.

| Parameter | NORM (3) | Sample Reception (1) | Dry basis (2) |
|---|---|---|---|
| Total humidity(%) | UNE-EN 14774-1:2010 | 6.18 | — |
| Residual humidity(%) | UNE-EN 14774-1:2010 | 6.18 | — |
| Ashes (%) | UNE-EN 14775:2010 | 23.03 | 24.55 |
| Volatile Material (%) | UNE-EN 15148:2010 | 60.76 | 64.75 |
| Fixed Carbon (%) | ASTM D3172 - 13 | 10.04 | 10.07 |
| Sulfur (%) | ASTM D4239 - 14e2 | 0.19 | 0.21 |
| High Calorific Value(kcal/kg) | UNE-EN 14918:2011 | 3379 | 3602 |
| Low Calorific Value(kcal/kg) | UNE-EN 14918:2011 | 3107 | 3350 |

(1) Sample reception = Condition in which the sample is delivered to the laboratory
(2) Dry basis = Material received with 0% moisture
(3) For appendix details see also the Appendix for details of the standards

TABLE 8

Results from the analysis on intermediate product.

| Parameter | NORM (3) | Sample Reception (1) | Dry-basis (2) |
|---|---|---|---|
| Carbon (%) | UNE-EN 15104:2011 | 34.2 | 36.45 |
| Hydrogen (%) | UNE-EN 15104:2011 | 5.23 | 4.84 |
| Nitrogen (%) | UNE-EN 15104:2011 | 0.85 | 0.91 |
| Oxygen (%) | UNE-EN 15296:2011 | 36.43 | 32.98 |
| Mn (ppm) | UNE-EN 15297:2011 | 230 | 245 |
| As (ppm) | UNE-EN 15297:2011 | <50 | <50 |
| Pb (ppm) | UNE-EN 15297:2011 | <50 | <50 |
| Cu (ppm) | UNE-EN 15297:2011 | <50 | <50 |
| Cr (ppm) | UNE-EN 15297:2011 | <50 | <50 |
| Cd (ppm) | UNE-EN 15297:2011 | <50 | <50 |
| Mo (ppm) | UNE-EN 15297:2011 | <50 | <50 |
| Ni (ppm) | UNE-EN 15297:2011 | <50 | <50 |
| V (ppm) | UNE-EN 15297:2011 | 70 | 75 |
| Co (ppm) | UNE-EN 15297:2011 | <50 | <51 |
| Zn (ppm) | UNE-EN 15297:2011 | 50 | 53 |
| Sb (ppm) | UNE-EN 15297:2011 | <50 | <50 |
| Cl (ppm) | UNE-EN 15289:2011 | 694.89 | 740.63 |

(1) Sample reception = Condition in which the sample is delivered to the laboratory
(2) Dry basis = Material received with 0% moisture
(3) For appendix details see also table 13

TABLE 9

Melting point of ash from reducing atmosphere of intermediate product.

| Parameter | Initial | final |
|---|---|---|
| Deformation temperature (° C.) | 1105 | 1150 |
| Softening Temperature (° C.) | 1125 | 1165 |
| Semi-sphere Temperature (° C.) | 1150 | 1210 |
| Fluidity Temperature (° C.) | 1230 | 1323 |

TABLE 10

Melting point of ash from reducing atmosphere of intermediate product.

| Parameter | Result |
|---|---|
| $SiO_2$ (%) | 7.02 |
| $Al_2O_3$ (%) | 18.54 |
| $Fe_2O_3$ (%) | 13.38 |
| MgO (%) | 4.09 |
| CaO (%) | 11.12 |
| $Na_2O$ (%) | 4.46 |
| $K_2O$ (%) | 2.18 |
| $TiO_2$ (%) | 0.18 |
| $P_2O_5$ (%) | 0.03 |
| $SO_3$ (%) | NS |
| $V_2O_5$ (%) | NS |
| MnO (%) | NS |

Results for the obtained laboratory tests for this final product following the steps of this invention, and that are shown on table 11 show that its degree of moisture is substantially lower than those observed on traditional firewood. Likewise, released particulate levels after combustion show better levels tan firewood or coal. Finally, this product's kilocalories are higher than those in firewood and coal.

TABLE 11

Results for the analysis of the final product.

| Parameter | NORM (3) | Sample Reception (1) | Dry-basis (2) |
|---|---|---|---|
| Total humidity(%) | UNE-EN 14774-1:2010 | 11.18 | |
| Residual humidity(%) | UNE-EN 14774-1:2010 | 11.18 | |
| Ashes (%) | UNE-EN 14775:2010 | 6.95 | 7.82 |
| Volatile Material (%) | UNE-EN 15148:2010 | 71.69 | 80.71 |
| Fixed Carbon (%) | ASTM D3172 - 13 | 10.19 | 11.47 |
| Sulfur (%) | ASTM D4239 - 14e2 | 0.18 | 0.21 |
| High Calorific Value(kcal/kg) | UNE-EN 14918:2011 | 3820 | 4301 |
| Low Calorific Value(kcal/kg) | UNE-EN 14918:2011 | 3490 | 4003 |

(1) Sample reception = Condition in which the sample is delivered to the laboratory
(2) Dry basis = Material received with 0% moisture
(3) For appendix details see also table 13

TABLE 12

Results for the analysis of the final product.

| Parameter | NCM (3) | Sample Reception (1) | Dry-basis (2) |
|---|---|---|---|
| Carbon (%) | UNE-EN 15104:2011 | 39.47 | 44.43 |
| Hydrogen (%) | UNE-EN 15104:2011 | 6.32 | 5.71 |
| Nitrogen(%) | UNE-EN 15104:2011 | 0.55 | 0.61 |
| Oxygen (%) | UNE-EN 15296:2011 | 46.49 | 41.17 |
| Mn (ppm) | UNE-EN 15297:2011 | 70 | 78.81 |
| As (ppm) | UNE-EN 15297:2011 | <50 | <50 |
| Pb (ppm) | UNE-EN 15297:2011 | <50 | <50 |
| Cu (ppm) | UNE-EN 15297:2011 | <50 | <50 |
| Cr (ppm) | UNE-EN 15297:2011 | <50 | <50 |
| Cd (ppm) | UNE-EN 15297:2011 | <50 | <50 |
| Mo (ppm) | UNE-EN 15297:2011 | <50 | <50 |
| Ni (ppm) | UNE-EN 15297:2011 | <50 | <50 |
| V (ppm) | UNE-EN 15297:2011 | <50 | <50 |
| Co (ppm) | UNE-EN 15297:2011 | <50 | <50 |
| Zn (ppm) | UNE-EN 15297:2011 | <50 | <50 |
| Sb (ppm) | UNE-EN 15297:2011 | <50 | <50 |
| Cl (ppm) | UNE-EN 15289:2011 | 416.29 | 468.68 |

Where <50 is not significant.
(1) Sample reception = Condition in which the sample is delivered to the laboratory
(2) Dry basis = Material received with 0% moisture
(3) For details see table 13.

TABLE 13

Details of the Standards used on the analyses for this invention.
USED STANDARDS

| | | |
|---|---|---|
| ASTM D3172 - 13 | Standard Practice for Proximate Analysis of Coal and Coke | http://www.astm.org/Standards/D3172.htm |
| ASTM D4239 14e2 | Standard Test Method for Sulfur in the Analysis Sample of Coal and Coke Using High-Temperature Tube Furnace Combustion | http://www.astm.org/Standards/D4239.htm |
| ASTM D4239 14e2 | Standard Test Method for Sulfur in the Analysis Sample of Coal and Coke Using High-Temperature Tube Furnace Combustion | http://www.astm.org/Standards/D4239.htm |
| UNE-EN 14774 1: 2010 | Solid biofuels. Determination of Moisture content. Oven dry method. Part 1: Total moisture. Reference method. | http://www.aenor.es/aenor/normas/normas/fichanorma.asp?tipo=N&codigo=N0045726#.VxD5C6jhDIU |
| UNE-EN 14775: 2010 | Solid biofuels. Determination of ash content. | http://www.aenor.es/aenor/normas/normas/fichanorma.asp?tipo=N&codigo=N0045971#.VxEDa6jhDIU |
| UNE-EN 14918: 2011 | Solid biofuels. Determination of calorific value. | http://www.aenor.es/aenor/normas/normas/fichanorma.asp?tipo=N&codigo=N0046857#.VxD8BqjhDIU |
| UNE-EN 15104: 2011 | Solid biofuels. Determination on total content of carbon, hydrogen and nitrogen. Instrumental methods. | http://www.aenor.es/aenor/normas/normas/fichanorma.asp?tipo=N&codigo=N0048348#.VxD8X6jhDIU |
| UNE-EN 15104: 2011 | Solid biofuels. Conversion of analytical results from one basis to another. | http://www.aenor.es/aenor/normas/normas/fichanorma.asp?tipo=N&codigo=N0048440#.VxD-GqjhDIU |
| UNE-EN 15148: 2010 | Solid biofuels. Determination of the content of volatile matter. | http://www.aenor.es/aenor/normas/normas/fichanorma.asp?tipo=N&codigo=N0045972#.VxD5hajhDIU |
| UNE-EN 15289: 2011 | Solid biofuels. Determination of total content of total sulfur and chlorine. | http://www.aenor.es/aenor/normas/normas/fichanorma.asp?tipo=N&codigo=N0048352#.VxEGcqjhDIU |

TABLE 13-continued

Details of the Standards used on the analyses for this invention.
USED STANDARDS

| | | |
|---|---|---|
| UNE-EN 15296: 2011 | Solid biofuels. Determination of minor elements. As, Cd, Co, Cr, Cu, Hg, Mn, Mo, Ni, Pb, Sb, V y Zn | http://www.aenor.es/aenor/normas/normas/fichanorma.asp?tipo=N&codigo=N0048507#.VxD2xqjhDIU |
| UNE-EN 15297: 2011 | Solid biofuels. Determination of total content of sulfur and chlorine. | http://www.aenor.es/aenor/normas/normas/fichanorma.asp?tipo=N&codigo=N0048352#.VxD4tKjhDIU |

TABLE 14

Melting point of oxidant reducing atmosphere ash from the final product.

| Parameter | Initial | Final |
|---|---|---|
| Deformation temperature (° C.) | 1105 | 1120 |
| Softening Temperature (° C.) | 1120 | 1133 |
| Semi-sphere Temperature (° C.) | 1140 | 1170 |
| Fluidity Temperature (° C.) | 1200 | 1228 |

TABLE 15

Chemical Analysis of Ash - Major, Minor and Trace Elements in the final product.

| Parameter | Result |
|---|---|
| $SiO_2$ (%) | 2.89 |
| $Al_2O_3$ (%) | 12.05 |
| $Fe_2O_3$ (%) | 11.49 |
| MgO (%) | 2.75 |
| CaO (%) | 15.88 |
| $Na_2O$ (%) | 2.58 |
| $K_2O$ (%) | 0.82 |
| $TiO_2$ (%) | 0.15 |
| $P_2O_5$ (%) | 0.03 |
| $SO_3$ (%) | NS |
| $V_2O_5$ (%) | NS |
| MnO (%) | NS |

Finally, comparative values between raw material that corresponds to untreated excrement, then intermediate product that corresponds to the product obtained from the liquid solid separator and two samples of final product final (sample 1 y sample 2)

TABLE 16

Calorific value, intermediate product, sample 1 y sample 2.

| | Raw Material | Intermediate Step | Final Product 2 | Final Product 1 |
|---|---|---|---|---|
| High Calorific Value(kcal/kg) | 3906 | 3602 | 4301 | 4545 |
| Low Calorific Value(kcal/kg) | 3639 | 3350 | 4003 | 4228 |
| $s_o\bullet$ of Energy Respect to Raw Material | | | | |
| High Calorific Value | 100% | 92% | 110% | 116% |
| Low Calorific Value | 100% | 92% | 110% | 116% |
| $s_o\bullet$ of Energy Respect to Secondary Product | | | | |
| High Calorific Value | 108% | 100% | 119% | 126% |

TABLE 16-continued

Calorific value, intermediate product, sample 1 y sample 2.

| | Raw Material | Intermediate Step | Final Product 2 | Final Product 1 |
|---|---|---|---|---|
| Low Calorific Value | 109% | 100% | 119% | 126% |
| Humidity(%) | 8.58 | 6.18 | 11.18 | 6.52 |
| Ashes(%) | 24.13 | 24.55 | 7.82 | 4.03 |
| Volatile Carbon Material(%) | 61.19 | 64.75 | 80.71 | — |
| Fixated Carbon(%) | 14.67 | 10.7 | 11.47 | — |
| Lost Kcal by Higher Moisture - 1% | 39.04 | 36.08 | 43.02 | 45.55 |
| Lost Kcal by Lower Moisture - 1% | 42.19 | 39.32 | 45.89 | 58.50 |
| REDUCING atmosphere | | | | |
| Softening Temperature e° | 1143 | 1125 | 1120 | — |
| Semi-sphere Temperature e° | 1158 | 1150 | 1140 | — |
| Fluidity Temperature e° | 1225 | 1230 | 1200 | — |
| OXIDANT atmosphere | | | | |
| Softening Temperature e° | 1168 | 1165 | 1133 | — |
| Semi-sphere Temperature e° | 1178 | 1210 | 1170 | — |
| Fluidity Temperature e° | 1220 | 1323 | 1228 | — |

Example 4. Quantitative and Qualitative Differences Between the Herewith Presented Invention Versus Traditional Burning of Duff on its Different Forms (Duff Pellets, Briquettes, or Natural Duff)

Comparatively with traditional burning of duff, the product obtained from the herewith presented invention is superior in kilocalories both in high calorific value and low calorific value levels, with 16% higher of kilocalories. Likewise, A reduction in chlorine levels is observed from 3445 particles (Duff) per million to 100 particles per million (presented Invention). (Results were obtained from the laboratory tests that are presented in "Laboratory Tests" Appendix, See Table 16 Results)

For its part, when comparing the product obtained from the presented invention versus the Product from the Liquid-Solid Separation presented in the WO2015086869A1 publication, the result is that the product of the presented invention shows 26.5% kilocalories more in the High and Low Calorific Value. Likewise, a reduction in chlorine levels is observed from 740 particles per million (Product with Solid-Liquid Separation) to 100 particles per million (Invention).

Comparative analysis exhibits other benefits (See Table 16), among those that stand out are heavy metal elimination like copper, vanadium, and zinc, which are present in Duff samples and Product with Solid-Liquid Separation.

As previously indicated (Page 15, line 6), burning of duff produced important health issues, as well as odor emanation (odor pollution). Likewise, it is known that use of high chlorine level fuels in boilers reduces their product life by rapidly rusting any type of steel.

TABLE 17

Comparison of results obtained from raw material, current market solid-liquid separation final product

|  |  | Raw material | Liquid solid separation according to WO2015086869A1 | Product obtained through the present invention. |
|---|---|---|---|---|
| High Calorific Value | (kcal/Kg) | 3906 | 3602 | 4545 |
| Low Calorific Value | (kcal/Kg) | 3639 | 3350 | 4228 |
| Total humidity | (%) | 8.58 | 6.18 | 6.52 |
| Ashes | (%) | 24.13 | 24.55 | 4.03 |
| Volatile material | (%) | 61.19 | 64.75 | 80.71 |
| Fixed carbon | (%) | 14.67 | 10.7 | 11.47 |
| RAW MATERIAL COMPOUNDS ||||||
| Sulfur | (%) | 0.29 | 0.21 | 0.11 |
| Carbon | (%) | 37.76 | 36.45 | 46.62 |
| Hydrogen | (%) | 5.14 | 4.84 | 6.07 |
| Nitrogen | (%) | 2.35 | 0.91 | 0.61 |
| Oxygen | (%) | 29.99 | 32.98 | 41.17 |
| Mn | (ppm) | 295 | 245 | 78.81 |
| As | (ppm) | <50 | <50 | <50 |
| Pb | (ppm) | <50 | <50 | <50 |
| Cu | (ppm) | 109 | <50 | <50 |
| Cr | (ppm) | <50 | <50 | <50 |
| Cd | (ppm) | <50 | <50 | <50 |
| Mo | (ppm) | <50 | <50 | <50 |
| Hg |  | — | — | — |
| Ni | (ppm) | <50 | <50 | <50 |
| V | (ppm) | 55 | 75 | <50 |
| Co | (ppm) | <50 | <50 | <50 |
| Zn | (ppm) | 131 | 53 | <50 |
| Sb | (ppm) | <50 | <50 | <50 |
| Cl | (ppm) | 3445.88 | 740.63 | 100 |
| ASHES COMPOUNDS ||||||
| SiO2 | (%) | 2.93 | 7.02 | 2.89 |
| Al2O3 | (%) | 12.33 | 18.54 | 12.05 |
| Fe2O3 | (%) | 10.49 | 13.38 | 11.49 |
| MgO | (%) | 6.23 | 4.09 | 2.75 |
| CaO | (%) | 16.23 | 11.12 | 15.88 |
| Na2O | (%) | 3.97 | 4.46 | 2.58 |
| K2O | (%) | 3.58 | 2.18 | 0.82 |
| TiO2 | (%) | 0.23 | 0.18 | 0.15 |
| P2O5 | (%) | 0.12 | 0.03 | 0.03 |
| SO3 | (%) | NS | NS | NS |
| V2O5 | (%) | NS | NS | NS |
| MnO | (%) | NS | NS | NS |
| TOTAL | (%) | 56.11 | 61 | 48.64 |

Hereafter, the obtained results for the product obtained from the method of the present invention are presented, respect raw material samples and respect the closest product in the state of art, where significant differences were observed, like higher high and low calorific value and less percentage of toxic compounds.

Hereafter, the ranges for high calorific value, low calorific value, total moisture and most relevant toxic compounds, expected from the obtained product from the present invention are presented.

Analyses were performed according to the rules previously indicated.

TABLE 18

Results of the analysis for the product obtained from the present invention

|  | Unit | Range |
|---|---|---|
| High Calorific Value | (kcal/kg) | 4200-5700 |
| Low Calorific Value | (kcal/kg) | 4000-5300 |
| Total Moisture | (w/%) | 1-10 |
| Ash | (w/%) | 0-10 |
| Sulfur | (w/%) | 0-0.3 |
| Chlorine | (w/%) | 0-0.15 |

Where (w/%) corresponds to dry weight.

The invention claimed is:

1. A method for obtaining a solid biofuel product having a lignin material, from manure of cattle, the method comprising:
   feeding the manure into a washing tank,
   adding, continuously, a flow of water in the washing tank having the fed manure;
   washing, continuously, the manure, in the washing tank by the flow of water, and by moving the manure along with the water to wash the manure using rotary movements, ultrasound energy and water drag, where the washing is performed at ambient pressure and temperature;
   removing, continuously, from the washing tank, the water having contaminants, obtained from the manure to a purifier and accumulator tank, to get clean solids in the washing tank;
   removing excess water from the clean solids by pressing or spinning the clean solids;
   supplying excess water from the clean solids, obtained via pressing or spinning of the clean solids, to the purifier and accumulator tank; and
   drying of the clean solids, wherein the clean solids as obtained comprises the lignin material.

2. The method of claim 1 further comprising:
   milling in a mincer mill, upon requirement, the manure prior to feeding the manure into the washing tank.

3. The method of claim 1, wherein feeding the manure into the washing tank comprises:
   supplying the manure or slurry of the manure from a basin to a conveyor system, the conveyor system having a liquid filtering system,
   washing, upon requirement, the manure on the conveyor system and filtering the washing manure via the liquid filtering system;
   milling in a mincer mill, upon requirement, the manure prior; supplying the manure via the conveyor system to the washing tank.

4. The method of claim 1, wherein feeding the manure into the washing tank comprises:
pumping slurry of the manure from a basin to a liquid and solid separator system, via a basing pump and a hose;
supplying water to the liquid and solid separator system to liquids and solids from the manure;
milling in a mincer mill, upon requirement, the obtained manure,
supplying the obtained manure via the conveyor system to the washing tank.

5. The method of claim 1, wherein feeding the manure into the washing tank comprises:
obtaining a stack of slurries of the manure,
milling in a mincer mill, upon requirement, the stack of slurries of the manure; supplying the stack of slurries of the manure to the washing tank.

6. The method of claim 1, wherein adding, continuously, a flow of water in the washing tank having the fed manure comprises:
pumping, continuously, via a liquid impulse pump, the flow of water from the purifier and accumulator tank to the washing tank at a first entry point and at a second entry point of the washing tank, wherein the first entry point is upper to the second entry point along a height of the washing tank.

7. The method of claim 6, wherein removing, continuously, the water having contaminants from the washing tank comprises:
supplying the water having contaminants from the washing tank to the purifier and accumulator tank,
cleaning the water from the contaminants in the purifier and accumulator tank to obtain clean water to be pumped back to the washing tank via the liquid impulse pump for continuously adding the flow of water to the washing tank.

8. The method of claim 7 further comprising:
supplying the contaminants from the purifier and accumulator tank or from the washing tank to a biological materials and inert impurities concentration tank for forming compost from the contaminants.

9. The method of claim 1 further comprising, prior to pressing or spinning the clean solids,
obtaining the clean solids from the washing tank to a liquid and solid separator tank, the liquid and solid separator tank having a magnetic plate;
cleaning, further, the clean solids for extracting ferrous elements and other impurities from the clean solid,
supplying the ferrous elements and the other impurities to at least one of the purified and accumulator tank and a biological materials and inert impurities concentration tank, for forming compost.

10. The method of claim 1, wherein drying of the clean solids comprises:
supplying hot air by a boiler to the clean solid.

11. The method of claim 1 further comprising:
adding coagulating agents to the washing tank having the manure; and adding detergents and/or flocculants to the washing tank having the manure.

12. The method of claim 1 further comprising:
adding scents to the dried clean solid having the lignin material.

13. The method of claim 1 further comprising:
pelletizing the dried clean solid having the lignin material to obtain lignin pellets or briquettes.

14. The method of claim 1 where the washing step is performed without incorporating chemical processes.

* * * * *